US012629778B2

(12) United States Patent
Sambi et al.

(10) Patent No.: US 12,629,778 B2
(45) Date of Patent: May 19, 2026

(54) LASER CUTTING HEAD FOR A MACHINE TOOL

(71) Applicant: SALVAGNINI ITALIA S.P.A., Sarego (IT)

(72) Inventors: Bruno Sambi, Sarego (IT); Gabriele Anzolin, Sarego (IT)

(73) Assignee: SALVAGNINI ITALIA S.P.A., Sarego (IT)

( * ) Notice: Subject to any disclaimer, the term of this patent is extended or adjusted under 35 U.S.C. 154(b) by 965 days.

(21) Appl. No.: 17/796,131

(22) PCT Filed: Feb. 4, 2021

(86) PCT No.: PCT/IB2021/050909
§ 371 (c)(1),
(2) Date: Jul. 28, 2022

(87) PCT Pub. No.: WO2021/156788
PCT Pub. Date: Aug. 12, 2021

(65) Prior Publication Data
US 2023/0057548 A1 Feb. 23, 2023

(30) Foreign Application Priority Data

Feb. 7, 2020 (IT) ......................... 102020000002476

(51) Int. Cl.
*B23K 26/38* (2014.01)
*B23K 26/03* (2006.01)
*B23K 26/70* (2014.01)

(52) U.S. Cl.
CPC ............ *B23K 26/38* (2013.01); *B23K 26/032* (2013.01); *B23K 26/705* (2015.10)

(58) Field of Classification Search
CPC ..... B23K 26/032; B23K 26/705; B23K 26/38
(Continued)

(56) References Cited

U.S. PATENT DOCUMENTS

| | | | |
|---|---|---|---|
| 8,134,099 B2 | 3/2012 | Nakano et al. | |
| 8,526,091 B2 * | 9/2013 | Ito ........................... | B23K 26/03 |
| | | | 219/121.68 |

(Continued)

FOREIGN PATENT DOCUMENTS

| | | | | |
|---|---|---|---|---|
| DE | 10 2017 131 224 | 6/2019 | | |
| DE | 102017131224 A1 * | 6/2019 | ............... | G02B 7/08 |

(Continued)

OTHER PUBLICATIONS

First Office Action issued Mar. 7, 2025 in corresponding Chinese Application No. 202180012908.2 with English translation.

(Continued)

*Primary Examiner* — Jimmy Chou
(74) *Attorney, Agent, or Firm* — Wenderoth, Lind & Ponack, L.L.P.

(57) ABSTRACT

A laser cutting head associable to a machine tool comprises a collimating group to collimate a laser beam coming from a laser emitting apparatus, a focusing group to focus in a focal point the laser beam collimated, an optical element to receive said laser beam focused and reflect a focused first portion thereof, and a wavefront sensor to receive said focused first portion of the laser beam, perform a phase measurement of a wavefront of said focused first portion, obtain a reconstructed wavefront on the basis of the phase measurement and send the reconstructed wavefront to an electronic processor; the electronic processor compares the reconstructed wavefront and a reference wavefront, determines one or more optical aberrations to which the laser beam is subjected, reduces such optical aberrations and changes said focal point.

21 Claims, 3 Drawing Sheets

(58) Field of Classification Search
USPC .................... 219/121.67; 351/211, 212, 204
See application file for complete search history.

(56) References Cited

U.S. PATENT DOCUMENTS

| 8,857,985 | B2 * | 10/2014 | Zhou ...................... A61B 3/102 |
| | | | 351/212 |
| 9,428,413 | B2 | 8/2016 | Nakano et al. |
| 10,173,285 | B2 | 1/2019 | Gesuita et al. |
| 10,622,254 | B2 * | 4/2020 | Nakano .................. B23K 26/53 |
| 11,673,207 | B2 | 6/2023 | Blázquez-Sánchez |
| 11,766,746 | B2 * | 9/2023 | Ivanov .............. B23K 26/0738 |
| | | | 219/121.67 |
| 2002/0190040 | A1 * | 12/2002 | Thompson, Jr. ..... B23K 26/066 |
| | | | 219/121.73 |
| 2004/0041978 | A1 * | 3/2004 | Neal ...................... G02B 27/30 |
| | | | 351/204 |
| 2008/0029497 | A1 * | 2/2008 | Eda ........................ B23K 26/53 |
| | | | 219/121.68 |
| 2008/0100829 | A1 * | 5/2008 | Watson .............. G01B 11/0608 |
| | | | 356/123 |
| 2010/0276403 | A1 | 11/2010 | Reitemeyer et al. |
| 2019/0035443 | A1 | 1/2019 | Park et al. |
| 2019/0258067 | A1 * | 8/2019 | Suhara .............. B23K 26/0648 |
| 2020/0361037 | A1 * | 11/2020 | Ivanov ................... B23K 26/38 |
| 2021/0003445 | A1 | 1/2021 | Blázquez-Sánchez et al. |
| 2021/0237198 | A1 * | 8/2021 | Ungaro ................ B23K 26/035 |
| 2021/0387286 | A1 * | 12/2021 | Ungaro ............. B23K 26/0738 |

FOREIGN PATENT DOCUMENTS

| JP | 2006-88216 | 4/2006 |
| JP | 6231684 | 10/2017 |
| KR | 10-2015-0039875 | 4/2015 |
| WO | 2019/082114 | 5/2019 |
| WO | 2019/170412 | 9/2019 |

OTHER PUBLICATIONS

Office Action issued Oct. 11, 2022 in corresponding Indian Patent Application No. 202227041813, with English translation.
Notice of Reasons for Refusal issued on Nov. 14, 2023 in corresponding Japanese Patent Application No. 2022- 548066, with English translation.
Request for the Submission of an Opinion issued on Oct. 23, 2023 in corresponding Korean Patent Application No. 10-2022-7030783, with English tranlation.
International Search Report dated Jun. 1, 2021 in corresponding International Application No. PCT/IB2021/050909.

* cited by examiner

LASER CUTTING HEAD FOR A MACHINE TOOL

The present invention relates to laser cutting devices for cutting machine tools and in particular relates to a laser cutting head for use in a fiber optic laser cutting system in a cutting machine or combined cutting/punching machine for metal sheets.

The use of laser systems for cutting, engraving and welding workpieces is known and widespread in the machine tool sector for processing metal sheets and plates.

As known, the laser is a device capable of emitting by means of a stimulated emission process monochromatic light, i.e. with a single wavelength, coherent in space and concentrated in a beam having very high luminosity (brightness). The ability to concentrate a big amount of energy in a very small area allows laser devices to cut, engrave and weld metals. The cutting of metal materials typically occurs by vaporization and, above all, by melting. In the latter case, the laser beam melts a small area of the workpiece and the molten metal (slag) is removed by a blow or jet of gas.

Within the laser emitting apparatuses, different types of sources can be used to generate a laser beam suitable for cutting metals. Gas lasers (dioxide, carbon monoxide $CO2$) and solid-state lasers (doped glass laser diodes and fiber lasers) are generally used.

Due to the high energy required for cutting sheet metal, even of great thickness, the dimensions and weight of the laser emitting devices are such as to prevent their positioning directly on the machine tools. To overcome this drawback, a laser cutting head or more simply a cutting or focusing head can be positioned on the machine tool and connected to the laser emitting apparatus through an optical chain (CO2 laser) or a transmission fiber (optical fiber, for example in YAG laser diodes) to emit the laser beam generated by the emitting apparatus and focus it on the workpieces. By virtue of its small size and low weight, the cutting head can in fact be moved by the machine tool with precision and speed to perform the cutting of the product.

In so-called fiber laser cutting systems, in which a fiber optic cable with diffuser prism is used to bring the laser beam to the cutting head, the latter typically comprises a collimating group which transmits the light beam exiting the fiber optic to a focusing group capable of focusing the laser beam on the workpiece, i.e., positioning its focal point or focus in a set point on the surface of the workpiece or just below or just above such a surface.

The focused laser beam exits the cutting head through a nozzle which concentrates the blow or jet of gas used to remove the slag generated by the melting of the metal and reduce the probability that the slag can reach the focusing group. For this purpose, a transparent element or protective window or glass is also provided at the nozzle, which separates the inside of the cutting head from the external environment and allows the passage of the laser beam exiting the focusing group.

The exact positioning of the focal point where all the power of the laser beam is concentrated is essential for performing the correct cutting of the material.

Laser cutting heads, in particular those with high power, are however subject to a phenomenon commonly known as "thermal focus shift", which causes the optical aberration of defocus or blurring, i.e. a shift of focus with respect to the desired and optimal point (on the surface of the piece or just below or just above it), as better explained below.

As is known, a small fraction of the energy of the laser beam passing through the lenses of the collimating and focusing optical groups is absorbed and transformed into heat, mainly due to the non-absolute transparency of the optical elements (coating and substrate). Further heat absorption may also be caused by the contamination and/or damage of the surface layer generally provided on the lens surfaces.

The prolonged use of the machine tool, in particular with extremely high laser powers, therefore causes a considerable heat absorption and a consequent increase of the temperature of the entire cutting head. This increase of temperature affects all the optical elements forming the cutting head, i.e. the diffusing prism of the transmission fiber, the collimating group, the focusing group and the separation glass (in particular the latter two, very close to the workpiece or to the melting area of the same where very high temperatures are concentrated) and causes a variation in both the refractive index of the lenses and their shape. The change of refractive index and lens shape caused by the increase in temperature causes the focal point to shift.

To compensate for the "thermal focus shift" phenomenon, the position of the focal point can be adjusted by suitably moving a lens of the focusing group, which is mounted on a respective tray or lens-carrying slide that is linearly movable along an adjustment direction parallel to the direction of the laser beam so as to allow the focusing of the laser beam. Alternatively, if it is suitable or necessary for the lens(es) of the focusing group to be kept fixed, the correct positioning of the focal point on the workpiece is achieved by suitably moving a lens of the collimating group, which is mounted on a respective linearly movable tray or slide.

The movement of the focusing or collimating group can be controlled manually by an operator through visual inspection of the laser beam projected on the workpiece, or by numerical control on the basis of the automatic measurement of the shift of the focal point. However, while visual inspection and manual control constrain the accuracy and repeatability of the cut to the operator's capabilities and hardly result in high quality processing, on the other hand, the measurements of the focal point shift require a great deal of time and expensive equipment and imply an increase in machine tool costs.

In addition, the heat absorption also causes a series of further aberrations such as spherical, coma and astigmatism aberrations, which also affect the wavefront of the laser beam, in particular the distribution of electromagnetic intensity within the laser beam, contributing to the decay of the cutting features or the impossibility of performing the cutting.

An object of the present invention is to improve the known laser cutting heads for use in cutting or combined cutting/punching machine tools for metal sheets, in particular fiber optic laser cutting heads.

Another object is to obtain a laser cutting head capable of ensuring cutting precision and repeatability, in particular with extremely high laser powers and also in the case of intense and prolonged use of the machine tool on which the laser cutting head is mounted.

A further object is to obtain a laser cutting head which allows a plurality of optical aberrations affecting the wavefront of the laser beam exiting the cutting head to be measured and reduced in a simple and effective manner.

Another object is to obtain a laser cutting head having a compact shape and particularly limited dimensions and which is economical and easy to make.

These and other objects are achieved by a laser cutting head according to the claims set out below.

The invention can be better understood and implemented with reference to the attached drawings which illustrate exemplifying and non-limiting embodiments thereof, in which:

FIG. 1 shows a first embodiment of the laser cutting head 1 according to the invention, which is associable with a cutting or combined cutting/punching machine tool for cutting and a mechanical piece 100, for example of a sheet metal.

Figure 1:
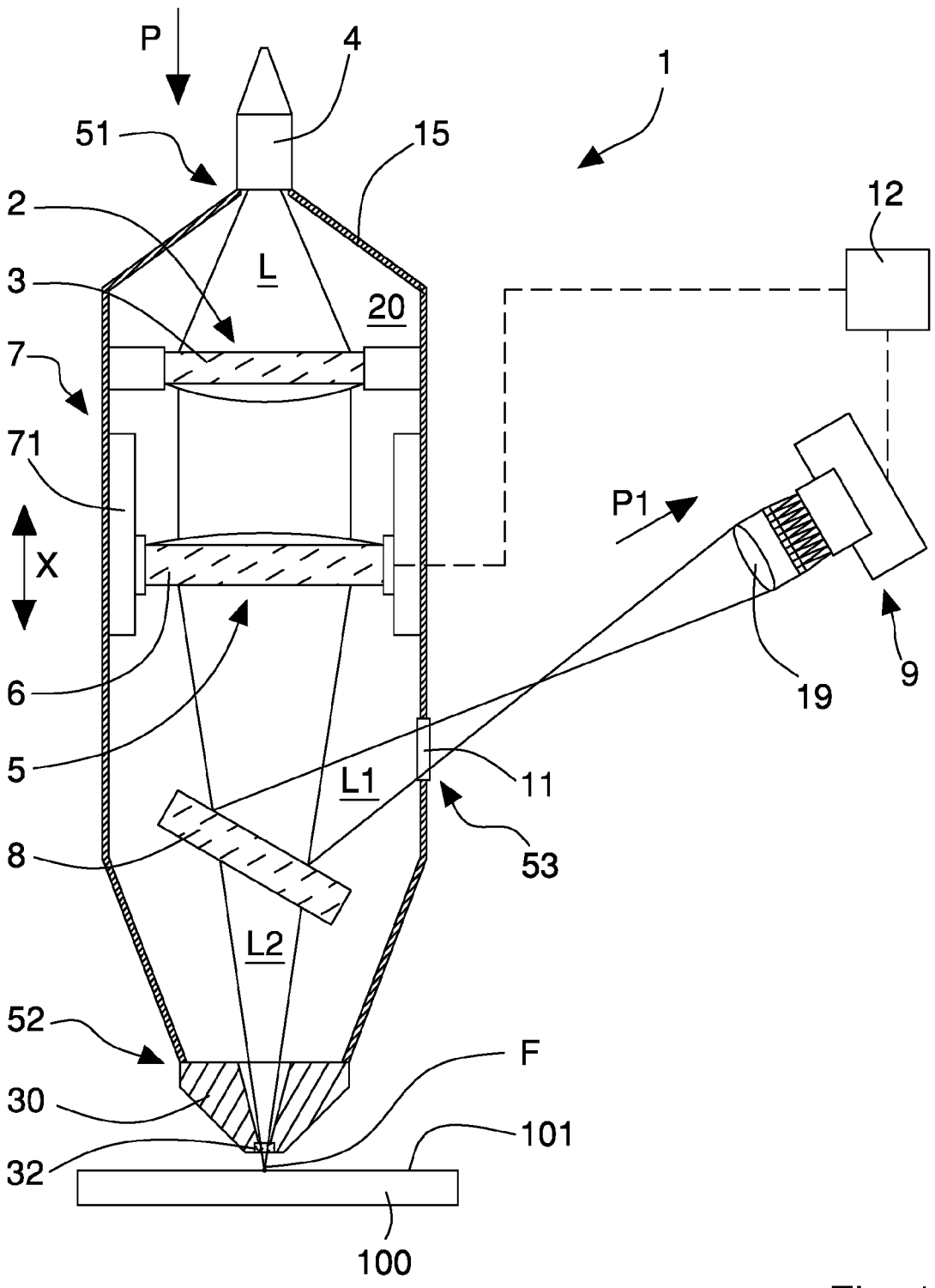
FIG. 1 is a simplified section of the laser cutting head of the invention according to a first embodiment.

The laser cutting head 1 is powerable by a laser emitting apparatus, not shown in the figure, through optical transmission means 4 such as an optical chain or a transmission fiber. In particular, the emitting apparatus is a solid-state fiber laser stimulated emission apparatus, for example with high power, and the optical transmission means 4 comprise a fiber optic cable for transporting a laser beam L generated by the emitting apparatus to the laser cutting head 1, the latter being capable of emitting the laser beam L and focusing it in a focal point F placed on a surface 101 of the piece 100 facing the laser cutting head 1 or just below or just above said surface 101.

The laser cutting head 1 comprises a collimating group 2 which includes at least one collimating lens 3 for collimating the laser beam L coming from the laser emitting apparatus, and a focusing group 5 which includes at least one focusing lens 6 for focusing in the focal point F the laser beam L exiting collimated from the collimating group 2.

Supporting and moving means 7 support and move along an adjustment direction X at least one between the collimating group 2 and the focusing group 5, for example only the latter in the embodiment illustrated in FIG. 1, in order to change the focal point F of the laser beam L. The supporting and moving means 7 comprise linear guide means 71 for slidably supporting and guiding the focusing group 5 along the adjustment direction X, preventing shifts and/or oscillations transverse to the adjustment direction X which would cause a shift of the focal point F of the laser beam L and/or a modification of the size and/or shape of the same focal point F on the piece 100.

The laser cutting head 1 further includes at least one optical element 8 for receiving the laser beam L exiting focused from the focusing group 5, reflecting at a given angle of reflection, for example between about 10° and about 100°, a focused first portion L1 of the received laser beam L and transmitting to the focal point F a focused second portion L2 of the same received laser beam L. The optical element 8 is for example a beam separator, in particular chosen among a cubic beam splitter (CBS), an optical prism and a semi-transparent mirror. Casing means 15 of the laser cutting head 1 form an internal space 20 adapted to contain at least the collimating group 2, the focusing group 5, the supporting and moving means 7 and the optical element 8.

The internal space 20 is closed and hermetically sealed, i.e. air-tight, from an external environment where the laser cutting head 1 is located. In other words, the casing means 15 prevent the entry into the internal space 20 of contaminants and foreign elements, in particular slag and solid and gaseous residues generated by the laser cutting, which could dirty the collimating lenses 3, the focusing lenses 5 and the optical element 8 or jeopardize the operation of the supporting and moving means 7.

To this end, the casing means 15, which can have a substantially cylindrical shape, parallelepiped shape or complex geometric shape, are provided with an inlet opening 51 coupled to the optical transmission means 4, which allows the entry into the internal space 20 of the laser beam L generated by the emitting apparatus, a side opening 53 hermetically closed by a transparent optical element 11 for the transmission of the focused first portion L1 of the laser beam L towards the external environment, and an outlet opening 52 positioned at a cutting nozzle 30 and hermetically closed by a separation glass 32. The latter, in addition to being adapted to separate the internal space 20 of the laser cutting head 1 from the external environment, allows the transmission of the collimated and focused laser beam L, in particular of the focused second portion L2, from the laser cutting head 1 towards the external environment.

The cutting nozzle 30 concentrates a blow or jet of gas intended to remove the slag generated by melting the workpiece 100 and at the same time contributes to reduce the probability that said slag can reach the inside of the laser cutting head 1 with the consequences above illustrated.

Linear guiding means 71 and further anti-rotation means are also housed inside the casing means 15, in particular are fixed to an inner wall thereof. The anti-rotation means, of a known type and not shown in detail in the figures, are arranged to prevent the supporting and moving means 7 from rotating around an axis parallel to the adjustment direction X during the movement of the collimating group 2 and the focusing group 5. The rotation of the lenses, in particular of the collimating lens 3, may in fact cause a shift of the focal point F of the laser beam L and a variation in the size and/or shape of such a focal point F on the piece 100. The laser cutting head 1 also comprises a wavefront sensor 9, of a known type and not further described in detail, for example a Shack-Hartmann wavefront sensor, and an electronic processor 12 connected to both the wavefront sensor 9 and to the supporting and moving means 7, in particular to the linear guiding means 71.

The wavefront sensor 9, which in the illustrated embodiment is positioned outside the casing means 15, is adapted to receive the focused first portion L1 of the laser beam L, which passes through the transparent optical element 11 closing the side opening 53 of the casing means 15, perform a phase measurement of a wavefront of the focused first portion L1, the latter being in particular collimated by a respective collimating optical system 19 positioned upstream of the wavefront sensor 9 with reference to a propagation direction P1 of the focused first portion L1, then obtain a reconstructed wavefront on the basis of said phase measurement and send the reconstructed wavefront to the electronic processor 12.

The electronic processor 12 is then configured to perform a comparison between the reconstructed wavefront obtained by the wavefront sensor 9 and a reference wavefront and, consequently, determine on the basis of such a comparison one or more optical aberrations which the focused first portion L1 of the laser beam L is subjected to.

It should be noted that, with respect to the focused second portion L2 of the laser beam L which hits and processes the piece 100, the focused first portion L1 is subject to further optical aberrations due to the transparent optical element 11 which closes the side opening 53 and through which said focused first portion L1 passes to reach the wavefront sensor 9. In order to improve the system accuracy, said further optical aberrations are advantageously known to the electronic processor 12, for example by initial or periodic calibration of the laser cutting head 1.

The reference wavefront with which the reconstructed wavefront is compared can be an ideal wavefront free of optical aberrations, for example in the case where a high-precision processing of the piece 100 is required, or a predetermined wavefront affected by predefined optical aberrations, for example in the case where the processing of the piece 100 must meet less stringent precision requirements.

The electronic processor 12 is then capable of operating the supporting and moving means 7 to move the collimating group 2 and/or the focusing group 5 along the adjustment direction X, in particular only the focusing group in the embodiment illustrated in FIG. 1, in order to reduce the optical aberrations of the laser beam L, in particular of the focused second portion L2, taking into account the further aberrations to which only the focused first portion L1 is subjected, and vary the focal point F.

More in detail and with reference to what has already been highlighted, in the case of high-precision processing, i.e. with an ideal reference wavefront free of optical aberrations, the electronic processor 12 is configured to operate the supporting and moving means 7, so that the optical aberrations of the laser beam L are minimized and in particular zeroed and changing the focal point F accordingly, while in the case of processing with less stringent precision requirements, i.e. in the case of a predetermined reference wavefront affected by predefined optical aberrations, the electronic processor 12 is configured to operate the supporting and moving means 7 so that the optical aberrations of the laser beam L are less than or equal to such predefined optical aberrations, changing the focal point F accordingly. Advantageously, the electronic processor 12 can control an alarm device, of a known type and not illustrated in the figures, for example a visual and/or acoustic alarm device. When the electronic processor 12 detects that the optical aberrations to which the laser beam L is subjected exceed a predetermined threshold value, for example set a priori by the user, it sends an activation signal to the alarm device which generates a visual and/or sound error signal. Thereby, the user can stop the processing of the piece 100 before the latter is irreversibly damaged by the laser beam L, subject to aberrations exceeding the threshold and therefore harmful to the piece 100, as it is not concentrated in the correct focal point F.

When associated with a machine tool and put into use, the laser cutting head 1 is capable of performing a method according to the invention for controlling the laser cutting of a piece 100. Such a method comprises the steps of:

performing the laser cutting of the piece 100 by means of the laser cutting head 1 associated to the machine tool;

powering the laser cutting head 1 with a laser beam L coming from a laser emitting apparatus;

collimating by means of the collimating group 2 and focusing, at the focal point F and by means of the focusing group 5, the laser beam L;

reflecting through the optical element 8 at least the focused first portion L1 of the laser beam L exiting focused from the focusing group 5;

performing through the wavefront sensor 9 a phase measurement of a wavefront of said focused first portion L1;

obtaining through the same wavefront sensor 9 a reconstructed wavefront on the basis of the phase measurement;

performing by means of the electronic processor 12 a comparison between the reconstructed wavefront and the reference wavefront;

determining by means of the same electronic processor 12 and on the basis of said comparison one or more optical aberrations to which the laser beam L is subjected;

reducing, in particular again by means of the electronic processor 12, the optical aberrations to which the laser beam L is subjected in order to change the focal point F.

In accordance with what has been seen so far, if a high-precision processing is required, i.e. the reference wavefront is an ideal wavefront free of optical aberrations, the reducing step comprises minimizing, in particular zeroing, the aforesaid one or more optical aberrations. Alternatively, if a processing with less stringent precision requirements is required and therefore the reference wavefront is a predetermined wavefront affected by predefined optical aberrations, the method according to the invention comprises the step of reducing the optical aberrations so that they are less than or equal to the predefined optical aberrations. Advantageously, when the optical aberrations exceed a predetermined threshold value, set a priori by the user, the method according to the invention comprises the step of emitting an error signal through an alarm device controlled by the electronic processor 12.

Still advantageously, the method according to the invention may further comprise the step of calibrating the laser cutting head 1, once for example when the machine tool is switched on or periodically during the processing of the piece 100. It is thereby possible to detect in particular the further optical aberrations introduced by the transparent optical element 11, to which the focused first portion L1 is subjected.

The laser cutting head 1 of the invention is therefore capable of ensuring cutting precision and repeatability, even with extremely high laser powers and in the context of intense and prolonged use of the machine tool on which the laser cutting head 1 is mounted.

Thanks to the wavefront sensor 9 connected to the electronic processor 12, it is in fact possible to measure a plurality of optical aberrations, including, for example, the shift of the focus due to the "thermal focus shift", spherical aberration, coma and astigmatism, affecting the laser beam L exiting the cutting head, in particular when the machine tool is used for a long time and with extremely high laser powers, causing an increase in temperature of all the optical elements and causing a change in both the refractive index of the lenses and their shape, with consequent shift of the focal point F. On the basis of the measurements of the wavefront, the electronic processor 12 is then capable of modifying the structure of the optical system, in particular by operating the supporting and moving means 7 of the collimating 2 and/or focusing 5 optical groups, to easily and effectively reduce the optical aberrations to which the laser beam L is subjected and thus change the focal point F so that it is positioned and concentrated at the desired point on the surface 101 of the piece 100 or just below or above such a surface 101.

Figure 2:
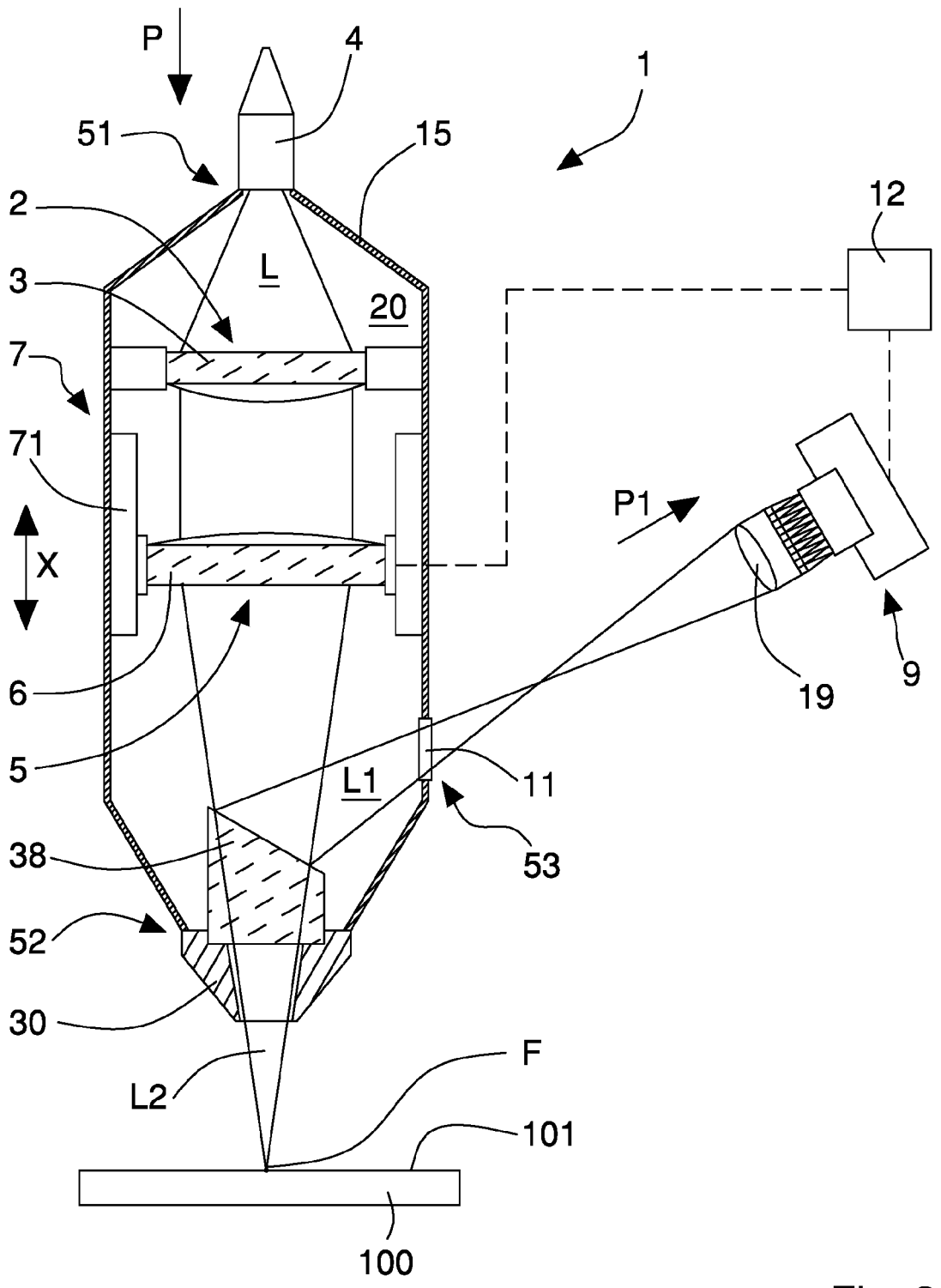
FIG. 2 is a simplified section of a variant of the laser cutting head of FIG. 1.

In a variant of the first embodiment of the laser cutting head 1 according to the invention, illustrated in FIG. 2, the output opening 52 that is positioned at the cutting nozzle 30 is hermetically closed by an optical element 38 capable of receiving the laser beam L exiting focused from the focusing group 5, reflecting with an angle of reflection, for example between about 10° and about 100°, a focused first portion L1 of the received laser beam L and transmitting to the focal point F a focused second portion L2 of the same received laser beam L. The optical element 38 is for example a beam separator, in particular chosen among a cubic beam splitter (CBS), an optical prism and a semi-transparent mirror.

The optical element 38 is positioned as a separation glass adapted to separate the internal space 20 of the laser cutting head 1 from the external environment. Thereby, the laser cutting head 1 requires fewer optical components and has a compact shape, particularly limited dimensions and reduced weight, thus being adapted to be associated in particular with a machine tool having stringent dimensions and handling requirements. This variant is also economic and easy to manufacture.

Figure 3:
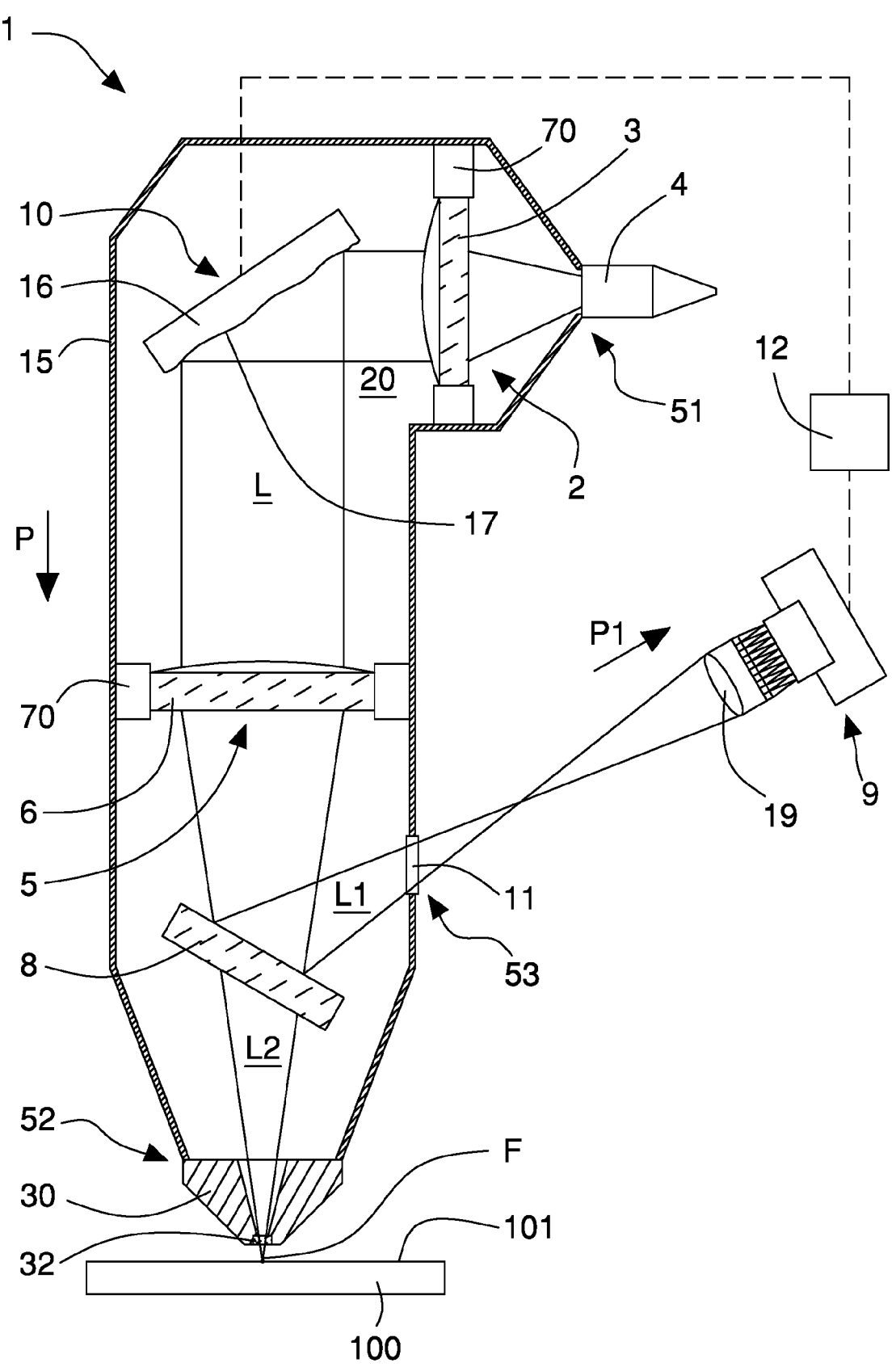
FIG. 3 is a simplified section of the laser cutting head of the invention according to a different embodiment.

FIG. 3 shows a second embodiment of the laser cutting head 1 according to the invention, which is also associable to a cutting and/or punching machine tool, respectively for cutting and/or punching a mechanical piece 100, for example a sheet metal.

In this second embodiment, the laser cutting head 1 comprises components similar to those described above and indicated with the same reference numbers, i.e. a collimating group 2 for collimating a laser beam L from a laser emitting apparatus, a focusing group 5 for focusing the laser beam L exiting collimated from the collimating group 2 in a focal point F, at least one optical element 8 for receiving the laser beam L exiting focused from the focusing group 5 and reflecting a focused first portion L1, and an electronic processor 12. The collimating group 2, the focusing group 5 and the optical element 8 are contained in the internal space 20 of the casing means 15. In particular, fixing means 70 support the collimating group 2 and focusing group 5 and hold them in a fixed position with respect to the casing means 15.

In a variant not shown, the optical element which receives the focused laser beam L, reflects the focused first portion L1 and transmits the focused second portion L2, also acts as a separation glass intended to separate the internal space 20 of the laser cutting head 1 from the external environment, with the aforesaid advantages of compact shape, particularly limited dimensions, reduced weight and low costs of the laser cutting head 1.

The laser cutting head 1 in this second embodiment comprises at least one adaptive optical device 10 having an adjustable shape.

As is known, the adaptive optical device 10 comprises an adaptive optical element 16 having a thickness such as to allow the deformability thereof and a suitable support consisting of piezoelectric or electromagnetic or electromechanical actuators, not visible in the figure, connected to the adaptive optical element 16 and the electronic processor 12 to model the shape of at least one deformable surface 17 of the adaptive optical element 16. Thus, the electronic processor 12 is capable of adjusting the shape of the adaptive optical device 10 by controlling the piezoelectric or electromagnetic actuators that support the adaptive optical element 16.

The adaptive optical device 10 is positioned upstream of the focusing group 5 with reference to a propagation direction P of the laser beam L which goes from the collimating group 2 to the focusing group 5, preferably downstream of the collimating group 2. Specifically, with reference to FIG. 3, the laser beam L generated by the emitting apparatus and transported by the optical transmission means 4 to the laser cutting head, exits collimated from the collimating group 2, hits the deformable surface 17 of the adaptive optical element 16 and is reflected by the latter towards the focusing group 5 following the propagation direction P. The laser cutting head 1 according to this second embodiment also comprises at least one wavefront sensor 9 adapted to receive the focused first portion L1 of the laser beam L, perform a phase measurement of a wavefront of the focused first portion L1, obtain on the basis of this phase measurement a reconstructed wavefront and send the reconstructed wavefront to the electronic processor 12.

The electronic processor 12 is configured to perform a comparison between the reconstructed wavefront and a reference wavefront, determine on the basis of such a comparison one or more optical aberrations to which the laser beam L is subjected, excluding the further optical aberrations to which only the first focused portion L1 is subjected, and control the piezoelectric or electromagnetic actuators to adjust the shape of the adaptive optical device 10, reduce the aforesaid optical aberrations and change the focal point F. Similar to what has already been seen, in the case of high-precision processing the reference wavefront is an ideal wavefront free of optical aberrations and the electronic processor 12 is configured to adjust the shape of the adaptive optical device 10 so that the optical aberrations of the laser beam L are minimized and in particular zeroed and thereby changing the focal point F. In the case of processing with less stringent precision requirements, the reference wavefront is a predetermined wavefront affected by predefined optical aberrations and the electronic processor 12 is configured to adjust the shape of the adaptive optical device 10 so that the optical aberrations of the laser beam L are less than or equal to such predefined optical aberrations and changing the focal point F.

In a different embodiment not shown, the laser cutting head 1 according to the invention may comprise both supporting and moving means 7, which support and move along an adjustment direction X at least one among the collimating group 2 and the focusing group 5, and an adaptive optical device 10, such components being contained in the internal space 20. In this case, the supporting and moving means 7 and the actuators of the adaptive optical device 10 are connected to the electronic processor 12. The electronic processor, in order to reduce the optical aberrations of the laser beam L and change the focal point F, is capable of both operating the supporting and moving means 7 of the optical groups and controlling the piezoelectric or electromagnetic actuators of the adaptive optical device 10, simultaneously or alternatively.

Alternatively to what is illustrated in the figures, the wavefront sensor 9 may be positioned at and hermetically seal the side opening 53 of the casing means 15 or positioned inside the internal space 20 of the laser cutting head 1, in this second case the side opening 53 and the transparent optical element 11 which hermetically closed said side opening, being not necessary.

The laser cutting head 1 according to any one of the further embodiments and variants described or according to a possible combination thereof, when associated with a machine tool and put into use, is also capable of implementing the steps of the method of the invention for controlling the laser cutting of a piece 100, in accordance with what has already been illustrated.

Advantageously, the laser cutting head 1 of the invention may also include a cooling unit, which is externally fixed to a respective wall of the casing means 15, and thermoconductive means, which connect the supporting and moving means 7 or the fixing means 70 to the said wall of the casing means 15, so as to extract by thermal conduction from the supporting and moving means 7 or fixing means 70 and from the collimating 2 and focusing 5 optical groups the heat generated in the latter ones when they are crossed by the laser beam L. For this purpose the supporting and moving means 7, the fixing means 70 and at least the respective wall of the casing means 15 are made of material with high thermal conductivity.

In a version of the laser cutting head 1 of the invention not shown in the figures, the collimating lenses 3 and the focusing lenses 6 are cooled by a cooling system of a known type which includes the introduction of gas (typically nitrogen) at a controlled temperature inside the laser cutting head 1 so as to lap and thus cool the lenses.

The invention claimed is:

1. A laser cutting head associable to a machine tool, the laser cutting head comprising:
   a collimating group to collimate a laser beam coming from a laser emitting apparatus;
   a focusing group to focus in a focal point the laser beam exiting collimated from said collimating group;
   a supporting and moving assembly to support and move along an adjustment direction at least one between said collimating group and said focusing group;
   at least one optical element to receive the laser beam exiting focused from said focusing group and reflect a focused first portion of the received laser beam;
   an electronic processor adapted to operate said supporting and moving assembly to move said at least one between said collimating group and said focusing group along the adjustment direction; and
   at least one wavefront sensor adapted to receive the focused first portion of the laser beam, perform a phase measurement of a wavefront of the focused first portion, obtain a reconstructed wavefront based on the phase measurement, and send the reconstructed wavefront to said electronic processor,
   wherein said electronic processor is configured to perform a comparison between the reconstructed wavefront and a reference wavefront, determine based on the comparison, one or more optical aberrations to which the laser beam is subjected, and operate said supporting and moving assembly to reduce the one or more optical aberrations and change the focal point.

2. The laser cutting head according to claim 1, wherein the reference wavefront is an ideal wavefront free of optical aberrations or a predetermined wavefront affected by predefined optical aberrations, said electronic processor being configured to operate said supporting and moving assembly so that the one or more optical aberrations are, respectively, minimized or zeroed or else are less than or equal to the predefined optical aberrations.

3. The laser cutting head according to claim 1, wherein said at least one wavefront sensor is a Shack-Hartmann wavefront sensor.

4. The laser cutting head according to claim 1, wherein said at least one optical element is a beam splitter.

5. The laser cutting head according to claim 1, further comprising a casing element forming an internal space adapted to contain at least said collimating group, said focusing group, said supporting and moving assembly, and said at least one optical element.

6. The laser cutting head according to claim 5, wherein said optical element is adapted to separate the internal space of the laser cutting head from an external environment.

7. The laser cutting head according to claim 5, wherein said casing element is provided with a lateral opening that is air-tight closed by a transparent optical element for transmission of the focused first portion of the laser beam towards an external environment, said wavefront sensor being external to said casing element.

8. The laser head according to claim 1, wherein said laser emitting apparatus is a fiber laser.

9. A laser cutting head associable to a machine tool, the laser cutting head comprising:
   a collimating group to collimate a laser beam coming from a laser emitting apparatus;
   a focusing group to focus in a focal point the laser beam exiting collimated from said collimating group;
   at least one adaptive optical device having adjustable shape;
   at least one optical element to receive the laser beam exiting focused from said focusing group and reflect a focused first portion of the received laser beam;
   an electronic processor adapted to adjust the shape of said adaptive optical device; and
   at least one wavefront sensor adapted to receive the focused first portion of the laser beam, perform a phase measurement of a wavefront of the focused first portion, obtain a reconstructed wavefront based on the phase measurement, and send the reconstructed wavefront to said electronic processor,
   wherein said electronic processor is configured to perform a comparison between the reconstructed wavefront and a reference wavefront, determine based on the comparison, one or more optical aberrations to which the laser beam is subjected and adjust the shape of said adaptive optical device to reduce the one or more optical aberrations and change the focal point.

10. The laser cutting head according to claim 9, wherein the reference wavefront is an ideal wavefront free of optical aberrations or a predetermined wavefront affected by predefined optical aberrations, said electronic processor being configured to adjust the shape of said adaptive optical device so that the one or more optical aberrations are, respectively, minimized or zeroed or else are less than or equal to the predefined optical aberrations.

11. The laser cutting head according to claim 9, wherein said adaptive optical device is positioned upstream of said focusing group with reference to a propagation direction of the laser beam.

12. The laser cutting head according to claim 9, wherein said at least one wavefront sensor is a Shack-Hartmann wavefront sensor.

13. The laser cutting head according to claim 9, wherein said at least one optical element is a beam splitter.

14. The laser cutting head according to claim 9, further comprising a casing element forming an internal space adapted to contain at least said collimating group, said focusing group, said at least one adaptive optical device, and said at least one optical element.

15. The laser cutting head according to claim 14, wherein said optical element is adapted to separate the internal space of the laser cutting head from an external environment.

16. The laser cutting head according to claim 14, wherein said casing element is provided with a lateral opening that is air-tight closed by a transparent optical element for transmission of the focused first portion of the laser beam towards an external environment, said wavefront sensor being external to said casing element.

17. The laser cutting head according to claim 9, wherein said laser emitting apparatus is a fiber laser.

18. A method for controlling a laser cutting of a workpiece, the method comprising the steps of:
   performing the laser cutting of the workpiece by a laser cutting head associated to a machine tool;
   powering the laser cutting head with a laser beam;
   collimating and focusing in a focal point the laser beam;

reflecting at least one focused first portion of the focused laser beam;

performing a phase measurement of a wavefront of the at least one focused first portion;

obtaining a reconstructed wavefront based on the phase measurement;

performing a comparison between the reconstructed wavefront and a reference wavefront;

determining based on the comparison, one or more optical aberrations to which the laser beam is subjected; and reducing the one or more optical aberrations to which the laser beam is subjected in order to change the focal point of the laser beam.

19. The method according to claim 18, wherein the reference wavefront is an ideal wavefront free of optical aberrations and said reducing comprises minimizing or zeroing, the one or more optical aberrations, or the reference wavefront is a target wavefront affected by predefined optical aberrations and said reducing comprises reducing the one or more optical aberrations so that they are smaller than or equal to the predefined optical aberrations.

20. The method according to claim 18, wherein said performing of the phase measurement and said obtaining of the reconstructed wavefront are implemented by a wavefront sensor.

21. The method according to any claim 18, further comprising the step of emitting an error signal when the one or more optical aberrations exceed a preset threshold value.

* * * * *